(12) United States Patent
Lieser et al.

(10) Patent No.: US 9,604,227 B2
(45) Date of Patent: Mar. 28, 2017

(54) SYSTEM AND METHOD FOR PROCESSING AND TREATING AN AGRICULTURAL BYPRODUCT

(71) Applicant: St. Martin Investments, Inc., St. Martin, MN (US)

(72) Inventors: Nicholas Lieser, Paynesville, MN (US); Brian Wenning, Avon, MN (US); Jamey Brick, Paynesville, MN (US)

(73) Assignee: ST. MARTIN INVESTMENTS, INC., St. Martin, MN (US)

( * ) Notice: Subject to any disclaimer, the term of this patent is extended or adjusted under 35 U.S.C. 154(b) by 656 days.

(21) Appl. No.: 13/923,850

(22) Filed: Jun. 21, 2013

(65) Prior Publication Data
US 2014/0374517 A1    Dec. 25, 2014

(51) Int. Cl.
| | |
|---|---|
| *B02C 23/30* | (2006.01) |
| *B02C 23/20* | (2006.01) |
| *B02C 23/16* | (2006.01) |
| *A23N 17/00* | (2006.01) |
| *B02C 23/18* | (2006.01) |

(52) U.S. Cl.
CPC .............. *B02C 23/20* (2013.01); *A23K 10/37* (2016.05); *A23K 50/10* (2016.05); *A23N 17/001* (2013.01); *B02C 23/16* (2013.01); *B02C 23/18* (2013.01); *B02C 2023/165* (2013.01); *Y02P 60/877* (2015.11)

(58) Field of Classification Search
CPC ......... B02C 23/30; B02C 23/18; B02C 23/16; B02C 2013/165; A23K 1/146; A23K 1/1813; A23K 50/10; A23K 10/37; A23N 17/001; Y02P 60/877
USPC ................................. 241/60, 101.71–101.78
See application file for complete search history.

(56) References Cited

U.S. PATENT DOCUMENTS

| | | | | |
|---|---|---|---|---|
| 5,566,890 | A | * | 10/1996 | Ricciardelli ............ B29B 17/02 241/20 |
| 6,207,228 | B1 | | 3/2001 | Hundt et al. |
| 8,550,384 | B2 | * | 10/2013 | Nitta ...................... A01F 29/005 241/18 |
| 2004/0109936 | A1 | * | 6/2004 | Banko ...................... A23G 3/26 427/2.14 |
| 2010/0155513 | A1 | | 6/2010 | Brick et al. |

\* cited by examiner

*Primary Examiner* — Mark Rosenbaum
(74) *Attorney, Agent, or Firm* — Billion & Armitage; Benjamin C. Armitage

(57) ABSTRACT

An apparatus is configured to apply a treatment agent to an agricultural byproduct. The apparatus includes a fragmenting chamber where the agricultural byproduct is fragmented into particles. An initial amount of a treatment agent is applied to the byproduct in the fragmenting chamber. Particles of a desired size flow through a screen from the fragmenting chamber to a recovery zone. A second amount of the treatment agent is applied to the particles in the recovery zone. A regulator regulates the amount of the treatment agent applied to the particles in the fragmenting chamber and the amount of treatment agent applied in the recovery zone. The regulation may be based on one or more feedback mechanisms.

9 Claims, 4 Drawing Sheets

SYSTEM AND METHOD FOR PROCESSING AND TREATING AN AGRICULTURAL BYPRODUCT

TECHNICAL FIELD

This disclosure relates to systems and methods for treating agricultural byproducts and more particularly to fragmenting an agricultural byproduct and regulating the quantity of a treatment agent applied to fragmented particles of the agricultural byproduct.

BACKGROUND

Treated agricultural byproducts, such as treated corn stover and wheat straw, may be used as animal feed. For example, treated corn stover may be used as a source of cattle feed. Corn stover generally refers to portions of a corn plant remaining after the grain or seeds have been harvested and may include harvest residues, such as stalks, cobs, husks, and leaves. Treatment generally refers to increasing the digestibility and acceptance of an agricultural byproduct for consumption. Stover and wheat straw are typically baled in order to facilitate handling and transport. Farmers often process bales with tub grinders or other equipment to produce particles when baled material is used as animal feed.

Treatment of corn stover may include utilizing chemical reactions to breakdown stover such that nutrients that normally would be unavailable during the digestive process can be digested. Treatment of corn stover may involve combining stover with a solution of calcium hydroxide (also referred to as hydrated lime, slaked lime, or pickling lime) and allowing the mixture to react for a predetermined amount of time. Calcium hydroxide may be formed by mixing water with calcium oxide derived from limestone. In addition to using calcium hydroxide, ammonia-based liquids may also be used to treat corn stover.

SUMMARY

In general, this disclosure describes techniques and apparatuses for treating agricultural byproducts to produce animal feed. In particular, this disclosure describes techniques and apparatuses for fragmenting an agricultural byproduct and regulating the quantity of a treatment agent applied to fragmented particles of the agricultural byproduct, such that the byproduct may be safely and efficiently converted into a source of animal feed.

According to one example of the disclosure, a method of applying a treatment agent to an agricultural byproduct comprises fragmenting an agricultural byproduct into particles in a fragmenting chamber, screening the particles such that particles of a desired size flow from the fragmenting chamber to a recovery zone, and regulating application of a treatment agent such that a first quantity of the treatment agent is applied to particles in the fragmenting chamber and a second quantity of the treatment agent is applied to screened particles in the recovery zone.

According to another example of the disclosure an apparatus configured to apply a treatment agent to an agricultural byproduct comprises a fragmenting system configured to fragment an agricultural byproduct into particles, a screen configured to screen the particles such that particles of a desired size flow from the fragmenting chamber to a recovery zone, and a regulator configured to regulate application of a treatment agent such that a first quantity of the treatment agent is applied to the particles in the fragmenting chamber and a second quantity of the treatment agent is applied to the screened particles in the recovery zone.

According to another example of the disclosure an apparatus configured to apply a treatment agent to an agricultural byproduct comprises means for fragmenting an agricultural byproduct into particles in a fragmenting chamber, means for screening the particles such that particles of a desired size flow from the fragmenting chamber to a recovery zone and means for regulating application of a treatment agent such that a first quantity of the treatment agent is applied to particles in the fragmenting chamber and a second quantity of the treatment agent is applied to screened particles in the recovery zone.

According to one example of the disclosure, a method of dispensing a treatment agent to a fragmenting system comprises receiving a solute and solvent, generating a solution of a desired concentration, and dispensing the generated solution to a fragmenting chamber and a recovery zone of the fragmenting apparatus according to a desired ratio.

According to another example of the disclosure an apparatus configured to dispense a treatment agent to a fragmenting system comprises a treatment agent system configured to receive a solute and solvent and generate a solution of a desired concentration and a dispensing system configured to dispense the generated solution to a fragmenting chamber and a recovery zone of the fragmenting apparatus at a desired ratio.

According to another example of the disclosure an apparatus configured to dispense a treatment agent to a fragmenting system comprises means for receiving a solute and solvent, means for generating a solution of a desired concentration, and means for dispensing the generated solution to a fragmenting chamber and a recovery zone of the fragmenting apparatus according to a desired ratio.

The details of one or more examples are set forth in the accompanying drawings and the description below. Other features, objects, and advantages will be apparent from the description and drawings, and from the claims.

BRIEF DESCRIPTION OF DRAWINGS

This written disclosure describes illustrative embodiments that are non-limiting and non-exhaustive. Reference is made to illustrative embodiments that are depicted in the figures, in which.

DETAILED DESCRIPTION

Figure 1:
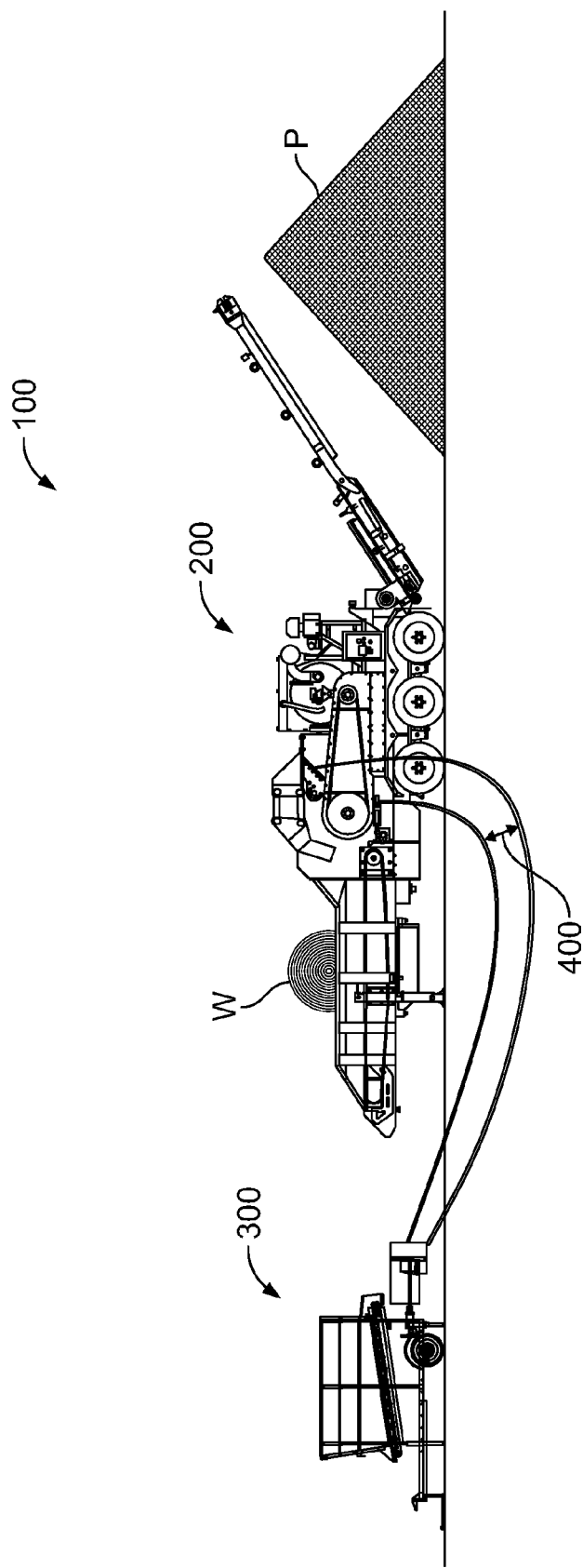
FIG. 1 is a diagram illustrating an example system for processing a byproduct with a treatment agent according to techniques of this disclosure.

This disclosure describes techniques and apparatuses for regulating the quantity of a treatment agent applied to a byproduct. In one example, techniques described herein may be used to safely and efficiently convert a byproduct into a source of animal feed. Byproducts may include, for example, stovers, straws or spent grains, such as, wet distillers grains (WGS) or other byproducts from ethanol or biodiesel production. Techniques of treating agricultural byproducts may include combining packaged quantities of agricultural byproducts with packaged quantities of treatment agents. One example technique for treating stover may include combining a 1,200-pound stover bale with a solution including 50 pounds of calcium hydroxide and storing the mixture in an oxygen free container for at least one week. Treating corn stover or other crop residues with an alkaline chemical slurry breaks down the chemical bonds in plant cells that inhibit digestion. Ruminant animals, such as cattle, can digest grains much more efficiently than the stalks and leaves. Breaking down cellular (lignin) bonds improves the digestibility. Grinding the crop residue not only improves the saturation of the chemicals, but also makes the forage more palatable, so that the animals eat more of the forage with less "sorting," i.e, rejection of large pieces. One example technique for combining stover with a solution of calcium hydroxide includes mixing lime, water, and stover using a tub grinder. Combining stover with a solution of calcium hydroxide using a tub grinder may be less than ideal. Such techniques often require manual loading of a tub grinder by lifting lime into a tub grinder, which may result in spillage. Spillage may result in the waste of materials, and spilled materials may be a potential hazard. Further, the resulting mixture generated by a tub grinder may be inconsistent and/or the resulting particles may not be the ideal size for a particular chemical reaction, resulting in longer reaction times. Oversized pieces may not completely react with a treatment agent, rendering them less digestible. Too many fine particles may soak up the chemical treatment, drawing it away from the larger particles, resulting in uneven saturation.

Commonly assigned U.S. Pat. No. 6,207,228 and U.S. patent application Ser. No. 12/641,855, each of which are incorporated by reference in their entirety, describe horizontal grinders that may combine bulky materials and impregnating agents. However, the horizontal grinders described in U.S. Pat. No. 6,207,228 and U.S. patent application Ser. No. 12/641,855 may be subject to binding when used to combine stover with calcium hydroxide. This disclosure describes techniques for efficiently processing stover for use as animal feed. In particular, this disclosure describes techniques and systems that are configured to apply a treatment agent during multiple stages of byproduct processing, such that the rate and manner in which a treatment agent and byproduct are combined may be optimized. In this manner, particles of stover of a desired size may be uniformly treated with calcium hydroxide or a similar treatment agent such as ammonia-based liquids.

The following description is made with particular reference to the treatment of stover for use as animal feed for cattle. However, an ordinarily skilled artisan will appreciate that the techniques and machines described herein can also be used more generally for combining bulk materials with an impregnating agent. For example, any and all combinations of the bulky materials and impregnating agents described in U.S. Pat. No. 6,207,228 may be combined using the machines and techniques described herein.

Embodiments of the present disclosure may be best understood by reference to the drawings, wherein like parts are designated by like numerals throughout. It will be readily understood that the components of the present disclosure, as generally described and illustrated in the drawings herein, could be arranged and designed in a wide variety of different configurations. Thus, the following more detailed description of the embodiments of the apparatus is not intended to limit the scope of the disclosure, but is merely representative of possible embodiments of the disclosure. In addition, the steps of a method do not necessarily need to be executed in any specific order, or even sequentially, nor need the steps be executed only once, unless otherwise specified. In some cases, well-known structures, materials, or operations are not shown or described in detail.

FIG. 1 is a diagram illustrating an example system for processing a byproduct W with a treatment agent. In the example of FIG. 1, system 100 includes waste fragmenting machine 200, treatment agent dispensing machine 300, and conduit 400. In the example illustrated in FIG. 1, byproduct W is processed by fragmenting machine 200 thereby generating product P. Treatment agent dispensing machine 300 may dispense a treatment agent through conduit 400. Fragmenting machine 200 may receive a treatment agent through conduit 400. In the example illustrated in FIG. 1, fragmenting machine 200 and/or dispensing machine 300 may control the flow of treatment agent through conduit 400. As described in greater detail below, the flow of treatment agent may be controlled based on any and all combinations of the following: a rate at which a byproduct is feed into a fragmenting machine, a rate at which a fragmenting machine fragments a byproduct, a measured weight or volume of a product, temperature of reaction in the fragmenting chamber, and/or a measured moisture level of product. Further, the flow of treatment agent through conduit 400 may be regulated at multiple stages. Thus, system 100 allows for a treatment agent applied to byproduct W at multiple stages using feedback. In some examples, the flow of treatment agent through conduit 400 may be highly automated.

In one example, byproduct W may be an agricultural byproduct, such as for example, corn stover or wheat straw. Byproduct W may be a bale of corn stover or wheat straw. In the case where byproduct W is corn stover, the treatment agent may be calcium hydroxide and product P may be particles of corn stover that have been treated with a quantity of calcium hydroxide, where the calcium hydroxide isolates nutrients, such as carbohydrates, from the stover. After undergoing treatment, product P may be used as animal feed. In one embodiment, wet distillers grains (WGS) or other byproduct from an ethanol or biodiesel production process may be added to the product P, such as before, during or after a desired reaction. In particular, product P may be used as a portion of a diet for cattle or other ruminants. System 100 may process byproduct W to produce product P of according to a desired particle size. The desired particle size may be determined by determining a particle size that facilitates efficiency for a particular chemical reaction and/or determining a particle size that is ideal for consumption by a particular animal. In one example, where product P treated corn stover for cattle feed, a desired particle size may be any particle size with an effective diameter within the range 50-100 mm. It should be noted that the ideal finished particle size varies according to several factors including, for example, type of crop residue, type of animal consuming the forage, treatment chemical used, and so on. The systems and techniques described here may be generally applied to generate product P having an ideal particle based on a particular application. Product P may be substantially uniform particles of a desired particle size. It should be noted that while the examples described with respect to FIG. 1 are described with respect to processing and treating agricultural waste products for use as animal feed, the machines and processes described herein may be generally applied to other processing and treatment applications.

Figure 2:
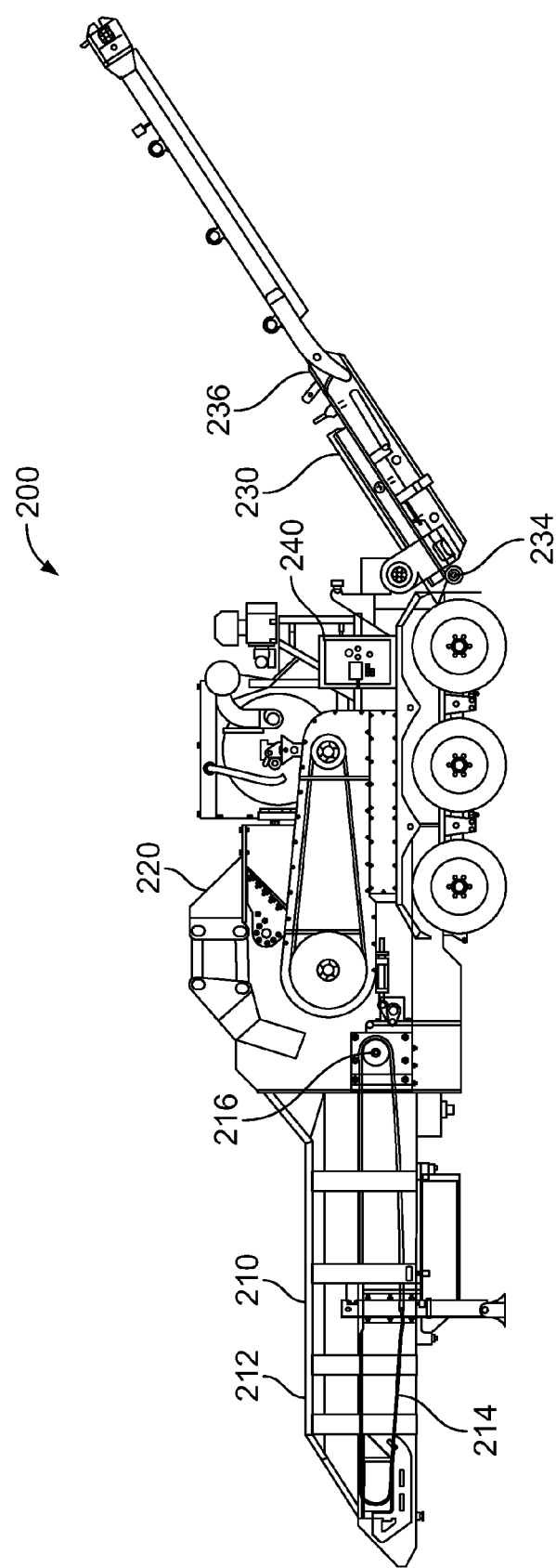
FIG. 2 is a diagram illustrating an example fragmenting machine for combining a byproduct with a treatment agent according to techniques of this disclosure.
Figure 3:
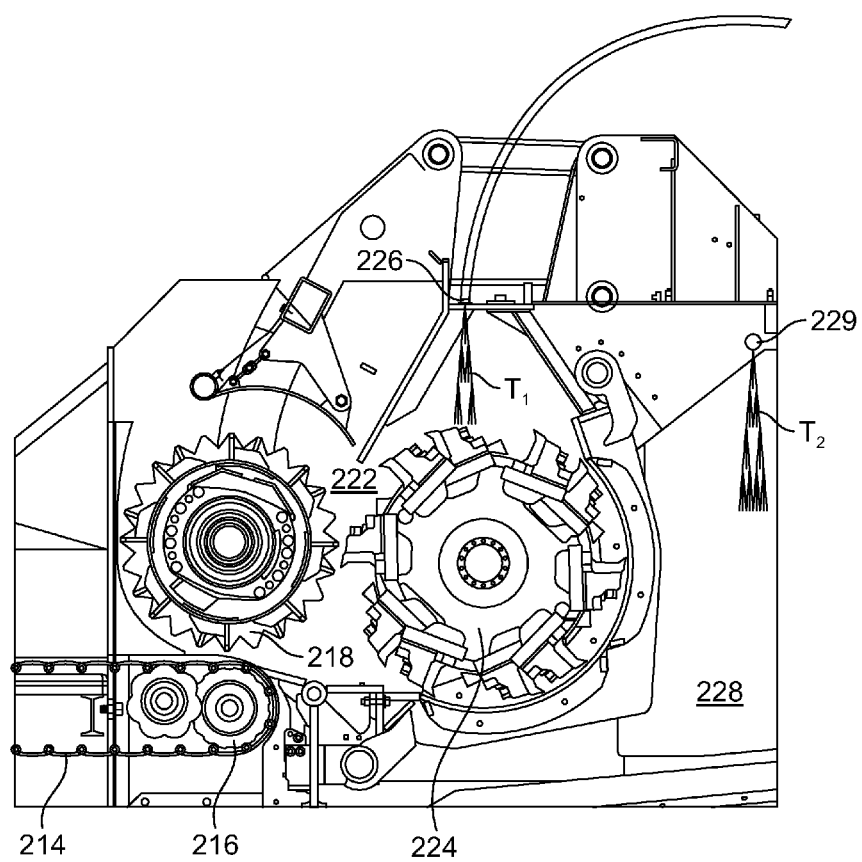
FIG. 3 is a cross-sectional view illustrating the example fragmenting machine illustrated in FIG. 2.

FIG. 2 is a diagram illustrating an example fragmenting machine 200 for combining a byproduct with a treatment agent according to techniques of this disclosure. FIG. 3 is a cross-sectional view of the example fragmenting machine 200 illustrated in FIG. 2. One example of a fragmenting machine 200 may be a horizontal grinder. Examples of horizontal grinders and the general operating principles thereof are described in detail in commonly assigned U.S. Pat. No. 6,207,228 and U.S. patent application Ser. No. 12/641,855. Waste fragmenting machine 200 may operate in a manner similar to horizontal grinders described in commonly assigned U.S. Pat. No. 6,207,228 and U.S. patent application Ser. No. 12/641,855 and may be generally configured to fragment byproduct W by utilizing tremendous impacting forces and apply treatment agents to fragmented waste products. However, as described in greater detail below, waste fragmenting machine 200 may be configured to optimize the application of treatment agents to waste products by using distinct application and processing stages. By applying treatment agents to waste products at distinct stages the efficiency and rate at which product P is generated may be optimized.

In the example illustrated in FIGS. 2 and 3 waste fragmenting machine 200 includes byproduct feed system 210, byproduct fragmenting system 220, product discharge system 230, and control system 240. Each of feed system 210, fragmenting system 220, and discharge system 230 include components for providing sufficient drive mechanisms and may be powered by one or more motors. Motors may include any and all combinations of power sources and may include electrical motors, internal combustion engines, diesel engines, hydraulic motors, industrial and tractor driven power take-off, and the like. Control 240 may control the operation of each of feed system 210, fragmenting system 220, and discharge system 230. The rate at which each of feed system 210, fragmenting system 220, and discharge system 230 operate may be based on a rate at which a byproduct W may be optimally processed into a desired product P and/or the total power of system 100.

Feed system 210 is configured to receive byproduct W and feed byproduct W into fragmenting system 220. In one example, feed system 210 may be configured to accommodate bales of corn stover, such as 1200-pound stover bales. As illustrated in FIGS. 2 and 3, feed system 210 may include hopper 212, conveyer 214, drive pulley 216, and feed wheel 218. Hopper 212 may provide an inlet for fragmenting machine 200 to continuously receive multiple bales of byproduct W. Hopper 212 may be constructed of structurally sufficient materials to protect and withstand the vigorous mechanical workings of fragmenting machine 200. Conveyer 214 may be configured as a continuously moving infeed conveyer and may feed byproducts W, such as bales of corn stover, to fragmenting system 220. A conveyer 214 may be suitably constructed of rigid apron sections hinged together and continuously driven about drive pulley 216. Drive pulley 216 may be driven by one or more motors (Not shown). Conveyer 214 may be operated at an apron speed of about 10 feet per minute (5 cm per second) to about 30 feet per minute (15 cm per second), depending upon the type of byproduct W.

As illustrated in FIG. 3, a feed wheel 218 is located at the end of the conveyer 214 adjacent to the fragmenting system 220. Feed wheel 218 includes a plurality of teeth positioned about an axis of rotation and is configured to grip and break up byproduct W as it is fed to the fragmenting system 220. In the example where byproduct W is a bale of corn stover, each tooth of feed wheel 218 may contact a bale at such an angle to penetrate the bale when the feed wheel 218 is drum is rotated in counter-clockwise direction. Feed wheel 218 may be driven by any of the example types of motors described above. Feed wheel 218 may be driven in either the clockwise or counter-clockwise directions at various rates of rotation. Further, controller 240 may control the rate at which feed wheel 218 rotates. It should be noted that in some examples, speeds of conveyor 214 and feed wheel 218 vary according to one or more of: a desired particle size of product P, consistency of byproduct W (e.g., moisture content, average raw material size, frangibility, and form i.e., round bale vs square bale vs bulk). For example, high moisture materials grind more slowly than drier material. Thus, drier materials may be fed at a faster rate than high moisture materials. Further, since bulk byproduct W is less dense than a square bale of byproduct W, the feed rate may be faster for bulk than for baled material. As described in detail below, smaller desired particles sizes require a finer screening. The finer the screening the slower conveyor 214 may need to run. Thus, feed rates may be adjusted proportionally to raw material consistency, available horsepower, etc. to maintain a consistent processing rate. A consistent processing rate may help to maintain a uniform application of treatments.

Further, the apron speed of conveyer 214 may be regulated according to a load on motors of system 100. In the case, where a motor is an engine, RPMs begin to drop as the fragmenting chamber 222 fills with byproduct W. If the RPMs drop below acceptable limits, conveyor 214 may slow or stop. In the case where a motor is an electric motor, this same concept would apply to amp draw. That is, as amps increase beyond acceptable limits the conveyor 214 may slow down or stop. In a typical application, it is desired to have as much material flowing through fragmenting chamber 222 as possible, so belt speed depends on available horsepower, screen size, raw material consistency, and other factors that determine processing rates. In this manner, feeding system 210 is configured to feed broken up bales of a byproduct W to fragmenting system 220.

In the examples illustrated in FIGS. 2 and 3, byproduct W is fed by a feed system 210 to fragmenting system 220. Fragmenting system 220 is configured to receive byproduct W and generate treated product P. As described above, feed system 210 may perform initial processing of byproduct W. As illustrated in FIGS. 2 and 3, fragmenting system 220 includes fragmenting chamber 222, fragmenting rotor 224, initial inlet port 226, screening system 227, recovery zone 228, and secondary inlet port 229. As illustrated in FIG. 3 fragmenting rotor 224 is located within fragmenting chamber 222. Similar to feed wheel 218, fragmenting rotor 224 includes a plurality of teeth positioned about an axis of rotation and is configured to breakup byproduct W. Teeth positioned about the axis of fragmenting rotor 224 may be configured to cut, tear or grind a byproduct W. Fragmenting rotor 224 operates to process byproduct W into particles. Fragmenting rotor 224 may be driven by any of the example types of motors described above. Fragmenting rotor 224 may be driven in either the clockwise or counter-clockwise directions at various rates of rotation. Further, controller 240 may control the rate at which fragmenting rotor 224 rotates.

In some examples, fragmenting rotor 224 may be rotated at an operational speed of approximately 1,000 revolutions per minute to about 2500 revolutions per minute. The rate at which fragmenting rotor 224 rotates may be based on the byproduct W and a desired particle size and/or the rate at which a treatment agent is to be applied to fragmented byproduct W. As fragmenting rotor 224 rotates it radially propels fragmented byproduct W along the curvature of the screen system 227. Screen system 227, which may include a one or more screens of different sizes, in cooperation with the teeth of fragmenting rotor 224, refines the byproduct W into a desired particle size until byproduct W is ultimately fragmented into particles of a sufficient particle size that may pass through screen system 227 into recovery zone 228. It should be noted that in some examples screen system 227 may be any system for examining and separating fragmented byproduct particles into separate groups and may not necessarily include a screen. For example, screen system 227 may separate particles using gravity or centrifugal forces without the use of screen. Thus, the term screening as used herein may generally refer to examining and separating into different groups and in some instances may more particularly refer to separating by passage through a screen. In the example, where byproduct W is corn stover and the product P intended to be used as animal feed a desired particle size may be a particle size with an effective diameter within the range of 50 mm to 100 mm. In this example, screen system 227 may include a screen with openings sized 2.5 inches to 6 inches (63 to 150 mm). It should be noted that the ideal finished particle size varies according to several factors including, for example, type of crop residue, type of animal the forage is for, treatment chemical used, and so on. Fragmenting rotor 224 may cause particles of a desired size to pass through screen system 227 at high speeds. Thus, particles may be airborne and moving at high speeds as they enter recovery zone 228.

As illustrated in FIG. 3 initial inlet port 226 allows treatment agent $T_1$ to flow into fragmenting chamber 222. In this manner, as byproduct W is fragmented into particles, treatment agent $T_1$ may be applied to the particles. Treatment agent $T_1$ or $T_2$ (described below) may include any of the impregnating agents described in U.S. Pat. No. 6,207,228. Impregnating agents can include gaseous, liquid, liquid-carried, powdered, and solid impregnating agents, and can be adapted to any cellulosic product.

Binding agents (e.g. plastics, thermosets, etc.) may be conveniently incorporated and impregnated into particulated paper, wood chips or fibers and the resultant impregnated product may be compressed or adhesively molded into a desired molded plasticized paper or plasticized wood product. Illustrative binding or film forming impregnating agents in the manufacture of such products bound together within a plastic material include a host of aqueous colloidal dispersions of polymers derived from the polymerization of monomers such as acrylic acid, methoacrylic acid, methyl methacrylate, ethyl methacrylate, ethyl-hexyl-acrylate, tetrafluoroethylene, chlorotrifluoroethylene, vinylidene fluoride, butadiene-1,3, isoprene, chloroprene, styrene, nitrites, acrylamide, vinyl alcohol, methacrylamide, acrylonitrile, vinyl chloride, vinyl acetate, vinylidene chloride, ethylene, propylene and isobutylene; drying oil fatty acid compounds such as tuna oil, linseed oil, soybean oils, dehydrated castor oil, cottonseed oil, poppyseed oil, safflower oil and sunflower oil; fatty acids derived from drying oils; partially polymerizates of drying oils such as partially polymerized linseed oil; oxidized drying oils such as oxidized soybean oil, synthetic drying oils obtained by the esterification of fatty acids with polyhydric alcohol (e.g. glycerol pentaerythritol, mannitol and sorbitol); drying oil-alkyl resins such as are obtained by the reaction of fatty acid drying oils with polyhydric alcohol and a polycarboxylic acid such as maleic anhydride, fumaric acid, phthalic acid, adipic acid, sebacic acid, etc.; lattices of chlorinated and natural rubbers, the polysulfides, epoxides, amino resins such as ureaformaldehyde, melamine-formaldehyde, nitrocellulose, ethyl cellulose, cellulose butyrate, chlorinated polyethers, terpene resins, chlorosulfonated polyethylene, natural rubber, organosiloxane polymers, and various other binding agents and film forming binders.

Liquid or aqueous dispersions or solutions of impregnating agents can be utilized. Water constitutes a carrier or vehicle for diluting and carrying liquid dispersible impregnating agents to the fragmenting chamber 222 and recovery zone 228. The water may function as a solvent for those impregnating agents which are partially or fully miscible with water. For certain impregnating agents, the impregnating agent may be colloidally suspended or dispersed in the water carrier. Emulsifying techniques using conventional emulsifiers or surfactants to emulsify water-insoluble or lipophilic impregnating agents into an aqueous emulsion may also be effectively utilized to place insoluble impregnating agents in a suitable form for dispersal in an aqueous carrier and injected into impregnating chamber 222 and recovery zone 228.

Color impregnating agents may be selected from a broad range of color pigments and dyes to provide a vast array of colored products. The color impregnating agents include the colored agents as well as white colorants with or without mineral products used as fillers and extenders. Various coloring agents may be blended together with the multiple colorant mixing system of this invention to provide the desired coloring effect. Illustrative coloring agents include the various water soluble and insoluble organic and inorganic pigments and dyes such as titanium dioxide, zinc oxide, phthalocyanine blue and green, lead chromate, molybdate orange, zinc sulfide, calcium sulfate, barium sulfate (barytes), clay, mica, calcium carbonate (whiting), silica, benzylidene yellow, cadmium yellow, toluidine toners, sienna, amber, ultramarine blues, chromium oxides, carbon black, antimony oxide, magnesium silicate (talc), aluminum silicate, lead silicate, graphite, aluminum oxide, calcium silicate, diatamaceous silica, limonite, hematite, magnetite, siderite, selenium sulfides, calcined nickel titanate dioxide, molybdate oranges, chrome green, iron bluides, benzidine yellows and oranges, iron salts of nitroso compounds, Hanso yellows, Di-nitraniline oranges, permanent red 2B types in various combinations thereof and the like. Pigment dispersants such as tetra-sodium pyrophosphate, lecithin, gum arabic, sodium silicate, the various water soluble soaps, the aliphatic and aromatic sulfonates sulfolignins, the aliphatic sulfates, various polyethers and ether-alcohol concentrates and the like may be added to enhance the aqueous dispersion of the pigments.

Auxiliary coloring components such as protective colloids or thickeners such as sodium carboxymethylcellulose, sodium and ammonium polyacrylate, gum karaya, sodium aliginate, methyl cellulose, hydroxyethyl cellulose, polyvinyl alcohol, starch, casein, soybean protein and gelatin; freeze-thaw stabilizers such as ethylene glycol, propylene glycol, glycol ethers, polysubstituted phenolates, modified glyceryl monoricinoleate, urea, thiourea, etc.; defoamers such as kerosene, pine oil, octyl alcohol, tributyl phosphate, phenyl mercuric acetate, etc.; buffers such as some of the protective colloids, sodium bicarbonate, sodium tetraborate and the like; coalescing agents such as "Carbitol," "Carbitol Acetate," hexylene glycol, "Butyl Cellosolve Acetate," and "Butyl Carbitol Acetate"; antirust agents like sodium benzoate; dryers for unsaturated polymers, oils, and alkyds, oil modified epoxides and polymeric butadienes, etc. (e.g. benzoyl peroxide, ferric tris 2,4-pentanedionate, chromium pentanedionate, the manganese, cobalt and lead naphthenates and the corresponding 2-ethylhexonates thereof) may also be incorporated into the coloring agent stream.

Commonly available colorant agent concentrates comprised of carbon black and iron oxide blended at a rate of about 0.25 to about 10 percent (preferably at about 0.5 percent to about 0.6 percent) volume concentrate per 10 water volumes provide a particularly effective color impregnating agent in the manufacture of colored wood mulches. If desired, bacteriocides and fungicides such as the halogenated acetylene alcohols, diphenylmercuric dodecenyl succinate, o-phenylphenol and the sodium salt thereof, the trichlorophenols and the sodium salts thereof, and the like may also be utilized as impregnating agents to protect the processed cellulosic product from bacteriological degradation. If a brightly red colored mulch is desired, iron oxide may be used as the colorant.

Initial inlet port 226 may include one or more valves for controlling the rate at which $T_1$ flows into fragmenting chamber 222. As described in greater detail below, the rate at which treatment agent $T_1$ flows into fragmenting chamber may be based on a feedback mechanism such that a desired amount of treatment agent $T_1$ is initially applied to byproduct W. In one example, the rate at which treatment agent $T_1$ flows into fragmenting chamber may be based on an amount of treatment agent required to coat or saturate particles of a desired size so that a chemical reaction, such as fermentation or the like, may subsequently occur in an effectively manner. In one example, the rate at which treatment agent $T_1$ flows into fragmenting chamber 222 may be controlled by control system 240. In one example, the rate at which treatment agent $T_1$ flows into fragmenting chamber may be controlled using a combination of manual and automatic control mechanisms.

It should be noted that during the normal operation of fragmenting system 220 the amount of treatment agent $T_1$ applied to the fragmented particles in fragmenting chamber 222 may adversely affect the operation of fragmenting system 220. That is, particular byproducts may absorb treatment agents such that the weight of the particles inhibits the rotation of fragmenting rotor 224. In some cases, binding may occur. Thus, in some cases it may be ineffective to apply the total required amount of treatment agent $T_1$ to particles in fragmenting chamber 222. Further, the amount of treatment agent $T_1$ that can effectively be applied may be based on the quality or purity of byproduct W. For example, high quality stover may be able to absorb more treatment agent $T_1$ compared to low quality stover. High quality stover can be contrasted to low quality stover in that low quality stover typically includes wet, rotten, or moldly bales of stover which may not be able to absorb as much moisture as high quality stover. As described in greater detail below the rate at which treatment agent flows into fragmenting chamber 222 may be controlled and/or limited in order to avoid binding. It should be noted that adding a liquid treatment agent inside fragmenting chamber 222 may be advantageous because the introduction of liquid often produces a finer particle size without requiring the use a smaller screen size. This is particularly advantageous when a finer particle is desirable. One key to producing finer particles for a given screen size is controlling the amount of liquid dispersed in fragmenting chamber 222 and dispersing the remainder of treatment agent to be applied in recovery zone 228.

As illustrated in FIG. 3, fragmenting chamber 222 and recovery zone 228 are separated by screen system 227. Secondary inlet port 229 allows treatment agent $T_2$ to flow into recovery zone 228. As described above, particles of fragmented byproduct W of a desired size flow through screen system 227 into recovery zone 228. The particles may be initially treated with treatment agent $T_1$ in fragmenting chamber 222. After initially treated particles of a desired size enter recovery zone 228 they may be treated with treatment agent $T_2$. Secondary inlet port 229 may include one or more valves for controlling the rate at which $T_2$ flows into recovery zone 228. Secondary inlet port 229 may be configured to disperse treatment agent $T_2$ such that a mist of $T_2$ is present in the recovery zone 228. As described above, particles may enter recovery zone 228 at high speeds. As such, particles may effectively pass through a mist of $T_2$, which allows for an even application of $T_2$ to particles. By contrast, if the particles simply fell and the treatment agent $T_2$ were sprayed onto particles from above, treatment agent $T_2$ may not evenly mix into all of the particles.

It should be noted that based on the desired treatment of byproduct W, treatment agents $T_1$ and $T_2$ may be same treatment agent or different agents. For example, $T_1$ may be a solution with a first concentration of a solute and treatment agent $T_2$ may be a treatment agent with a higher or lower concentration of a solute. In one example, where the byproduct W is corn stover and treatment agents $T_1$ and $T_2$ are calcium hydroxide, the flow of treatment agent $T_1$ into fragmenting chamber 222 and the flow of $T_2$ into recovery zone 228 may be regulated such that 15-20% of the required amount of calcium hydroxide is applied to the corn stover in the fragmenting chamber 222 and the remaining 80-85% of the required amount of the calcium hydroxide is applied to the corn stover in the recovery zone 228. In this manner, the ratio of the quantity of calcium hydroxide applied during a fragmenting stage to the quantity of calcium hydroxide applied during the recover stage may be approximately one to four. This ratio may be modified based on types of byproducts W and treatment agents. For example, the flow of treatment agent $T_1$ into fragmenting chamber 222 and the flow of $T_2$ into recovery zone 228 may be regulated such that 10-90% of the required amount of calcium hydroxide is applied to the corn stover in the fragmenting chamber 222 and the remaining 10-90% of the required amount of the calcium hydroxide is applied to the corn stover in the recovery zone 228. Further, as described in greater detail below the quantity of treatment agent $T_2$ applied during the recovery stage may be increased or decreased based on a feedback mechanism. In one example, the rate at which treatment agent $T_2$ flows into recovery zone 228 may be controlled by control system 240. In one example the rate at which treatment agent $T_2$ flows into recovery zone 228 may be controlled using a combination of manual and automatic control mechanisms. As illustrated in FIG. 3, treated particles of byproduct W fall from recovery zone 228 onto discharge system 230. As illustrated in FIG. 3 discharge system 230 includes conveyer 232, moisture sensor 234, and belt scale 236. Conveyer 232 may be configured as a continuously moving discharge conveyer and may output product P to a storage location. A conveyer 232 may operate in a manner similar to conveyer 214 described above. Conveyer 232 may be continuously driven about drive pulley 234. Drive pulley 234 may be driven by one or more of the example motors described above (Not shown). Conveyer 232 may be operated at an apron speed such that P is discharged a desired distance from fragmenting machine 200 and the discharge rate is greater than the rate at which discharge system 230 receives product from recovery chamber 230.

Moisture sensor 234 and belt scale 236 may be communicatively coupled to control system 240. In one example, moisture sensor 234 and belt scale 236 may be communicatively coupled to control system 240 via a control bus using a standardized control bus protocol. Moisture sensor 234 may be configured to measure the amount of treatment agent absorbed by product P. In the example where byproduct W is corn stover and the treatment agent is calcium hydroxide, an optimum moisture level of product P may be approximately 50%. In other examples, the optimum moisture level of product P may be approximately 10%-90%. Moisture sensor 234 may be a commercially available moisture sensor, such as, for example, a digital microwave moisture sensor available from Hydronix.

Belt scale 236 may be configured to measure the weight of product P produced by fragmenting system 220 over a time period, such that a quantity of product P can be calculated. Control system 240 may include a display to communicate the moisture measurement and/or weight measure to an operator. The display may include a combination of mechanical gauges and electronic indicators, such as an LCD display. Further, control system 240 may include either mechanical (e.g., levers) and/or electronic controls (such as, for example, circuitry, hardware, software, processors and combinations thereof) such that an operator can control the operation of any and all combinations of feed system 210, fragmenting system 220, discharge system 230, and individual components thereof.

In one example, control system 240 may include a processor that may receive measurements from moisture sensor 234 and belt scale 236 and may control the operation of any and all combinations of feed system 210, fragmenting system 220, discharge system 230, and individual components thereof, such that a desired product P is produced. In one example, control system 240 may calculate the quantity of treatment agent applied to byproduct P based on a weight measurement and/or a moisture level measurement, if control system 240 determines that the quantity of treatment agent applied to byproduct W is either too high or low, control system 240 may increase or decrease the rate at which either $T_1$ flows into fragmenting chamber 222 and/or the rate at which $T_2$ flows into recovery chamber 228. In one example, control system 240 may stop the flow of $T_1$ and/or $T_2$. In one example, the flow of $T_1$ and $T_2$ may be stopped, if control system 240 determines particles are not flowing into recovery zone 228. In one example, control system 240 may control the flow of $T_1$ and $T_2$ by controlling one or more valves of initial inlet port 226 and/or secondary inlet port 229. Further, as described in greater detail below with respect to FIG. 4 control system 240 may control the rate at which a treatment agents are produced, the concentration of treatment agents, and the rate at which a treatment agents are pumped to fragmenting system 200 via conduit 400. In this manner, fragmenting machine 200 represents an example of a fragmenting machine configured to fragment an agricultural byproduct into particles in a fragmenting chamber, screen the particles such that particles of a desired size flow from the fragmenting chamber to a recovery zone, and regulate an application of a treatment agent such that a first quantity of the treatment agent is applied to particles in the fragmenting chamber and a second quantity of the treatment agent is applied to screened particles in the recovery.

Figure 4:
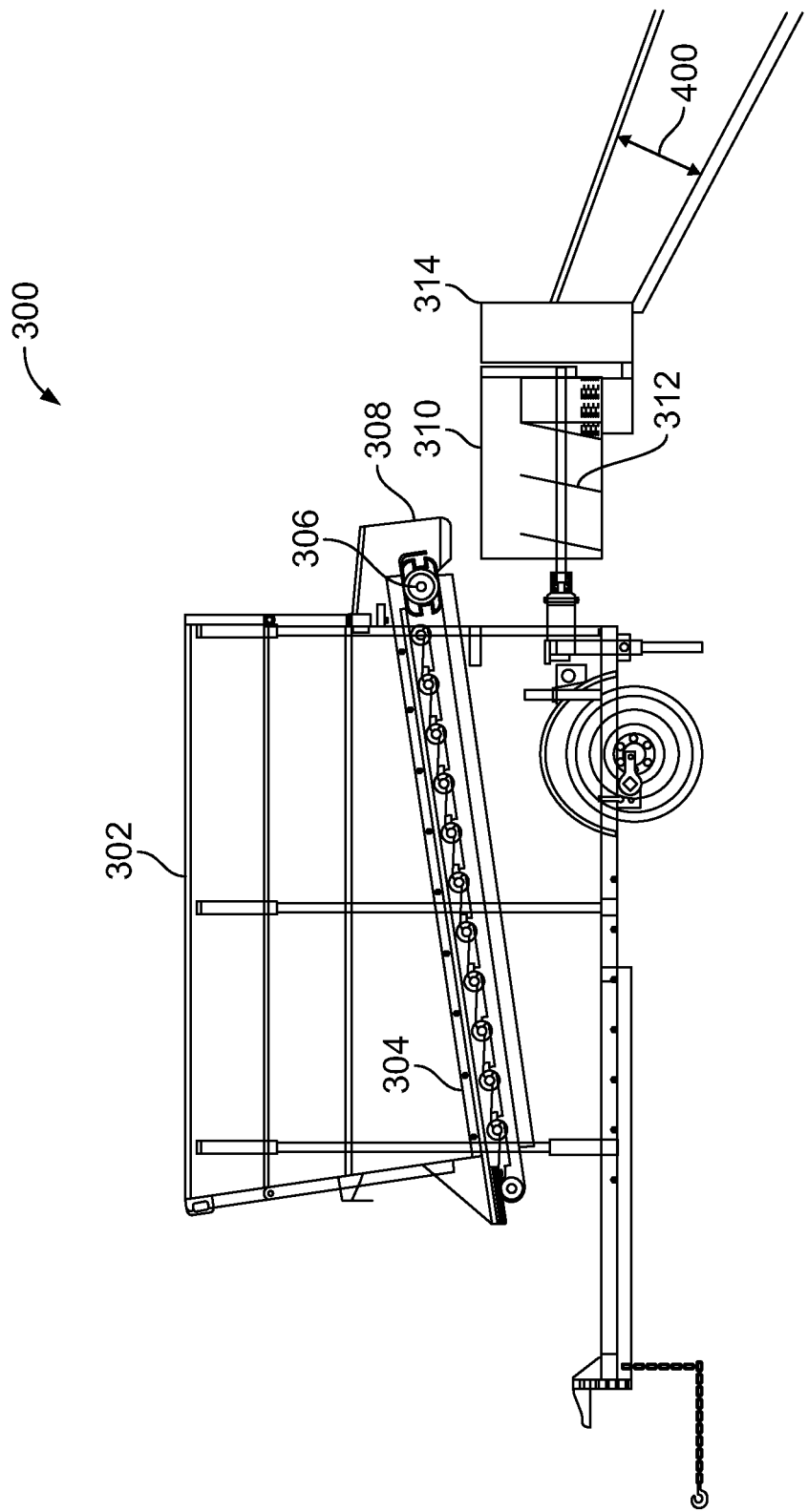
FIG. 4 is a diagram illustrating an example of a treatment agent dispensing machine for producing a treatment agent in accordance with the techniques of this disclosure.

FIG. 4 is a diagram illustrating an example of a treatment agent dispensing machine for producing a treatment agent in accordance with the techniques of this disclosure. Treatment agent dispensing 300 may additionally or alternatively regulate the application of a treatment agent such that a first quantity of the treatment agent is applied to particles in the fragmenting chamber 222 and a second quantity of the treatment agent is applied to screened particles in the recovery zone 228. In the example illustrated in FIG. 4, treatment agent dispensing machine 300 is configured to produce a treatment agent by mixing a soluble material with a liquid and pumping the resulting solution through conduit 400. The treatment agent dispensing machine 300 may be alternatively integrated with or attached to the fragmenting machine 200. In the example illustrated in FIG. 4, treatment agent dispensing machine 300 includes hopper 302, conveyer 304, drive pulley 306, belt scale 308, and pug mill 310. Pug mill 310 includes a mixing auger 312 and pump 314.

Hopper 302 may provide an inlet for treatment agent dispensing machine 300 to continuously receive a soluble material. In one example, the soluble material may be calcium oxide or lime. Hopper 302 may be constructed such that it has a volume to hold a sufficient amount of material while having a height that facilitates ergonomic loading of the material into the hopper 302. Conveyer 304 may be configured as a continuously moving conveyer and may meter the rate at which a material is fed into pug mill 310. Conveyer 304 may include an apron that is continuously driven about drive pulley 306. Drive pulley 306 may be driven by one or more of the example motors described above (Not shown). Further, the apron speed of conveyor 304 may be controlled based on measurements taken at any stage of the process performed by the system 100. For example, the apron speed of conveyor 304 may be based on measurements from moisture sensor 234 and/or belt scale 236. Further, as illustrated in FIG. 4, treatment agent dispensing machine 300 includes belt scale 308. The apron speed of conveyor 304 may be controller based on the rate at which material is being fed into pug mill 310 based on a measurement determined by belt scale 308. Belt scale 308 may be similar to belt scale 236 described above with respect to FIG. 2. It should be noted that the conveyer 304 may be communicatively coupled (e.g., through wired or wireless electronic communication techniques) to a local controller (not shown) and/or control system 240, such that the apron speed of conveyor 304 may be controlled.

As illustrated in FIG. 4, pug mill 310 is located below conveyer 304. As conveyer 304 meters material, such as lime, material falls into pug mill 310. Pug mill 310 may be configured to continuously receive a liquid, such as water. Mixing auger 312 may be configured to rotate about an axis such that a material dissolves with the received liquid thereby creating a solution of a desired concentration. As illustrated in FIG. 4, pug mill 310 includes a pump 314 coupled to conduit 400. Pump 314 is configured to pump a solution of a desired concentration to fragmenting system 200. Pump 314 may include any pump configured to pump a volume of a solution to fragmenting system 200 at a rate according to a desired treatment application. For example, pump 314 may be configured to pump a volume solution including 50 pounds of calcium hydroxide base on a rate at which fragmenting system 200 fragments and treats a 1,200-pound stover bale with the solution. It should be noted that, similar to conveyer 304, mixing auger 312 and pump 314 may be controlled by a local controller and/or control system 240 based on measurements taken at any stage of the process performed by the system 100. Further, it should be noted that while conduit 400 is illustrated split as two distinct conduits at pug mill 314, the splitting of conduit 400 may occur anywhere along the path between treatment agent dispensing machine 300 and initial inlet port 226 and secondary inlet port 229. Further, pug mill 314 may include valves that regulate the flow of $T_1$ and $T_2$ include fragmenting chamber 222 and recovery zone 228.

In this manner, system 100 represents an example of a system configured to fragment an agricultural byproduct into a particles in a fragmenting chamber, screen the particles such that particles of a desired size flow from the fragmenting chamber to a recovery zone, and regulating application of a treatment agent such that a first quantity of the treatment agent is applied to the particles in the fragmenting chamber and a second quantity of the treatment agent is applied to the screened particles in the recovery zone.

Where a range of values is provided, it is understood that each intervening value, to the tenth of the unit of the lower limit unless the context clearly dictates otherwise, between the upper and lower limit of that range and any other stated or intervening value in that stated range is encompassed within the disclosure. The upper and lower limits of these smaller ranges which may independently be included in the smaller ranges are also encompassed within the disclosure, subject to any specifically excluded limit in the stated range. Where the stated range includes one or both of the limits, ranges excluding either both of those included limits are also included in the disclosure.

Unless defined otherwise, all technical and scientific terms used herein have the same meaning as commonly understood by one of ordinary skill in the art to which this disclosure belong. Although any methods and materials similar or equivalent to those described herein can also be used in the practice or testing of the disclosure, the preferred methods and materials are now described. All patents and publications mentioned herein, including those cited in the Background of the application, are hereby incorporated by reference to disclose and described the methods and/or materials in connection with which the publications are cited.

The publications discussed herein are provided solely for their disclosure prior to the filing date of the present application. Nothing herein is to be construed as an admission that the present disclosure are not entitled to antedate such publication by virtue of prior invention. Further, the dates of publication provided may be different from the actual publication dates which may need to be independently confirmed.

Other embodiments of the present disclosure are possible. Although the description above contains much specificity, these should not be construed as limiting the scope of the disclosure, but as merely providing illustrations of some of the presently preferred embodiments of this disclosure. It is also contemplated that various combinations or sub-combinations of the specific features and aspects of the embodiments may be made and still fall within the scope of this disclosure. It should be understood that various features and aspects of the disclosed embodiments can be combined with or substituted for one another in order to form various embodiments. Thus, it is intended that the scope of at least some of the present disclosure should not be limited by the particular disclosed embodiments described above.

Thus the scope of this disclosure should be determined by the appended claims and their legal equivalents. Therefore, it will be appreciated that the scope of the present disclosure fully encompasses other embodiments which may become obvious to those skilled in the art, and that the scope of the present disclosure is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims.

The foregoing description of various preferred embodiments of the disclosure have been presented for purposes of illustration and description. It is not intended to be exhaustive or to limit the disclosure to the precise embodiments, and obviously many modifications and variations are possible in light of the above teaching. The example embodiments, as described above, were chosen and described in order to best explain the principles of the disclosure and its practical application to thereby enable others skilled in the art to best utilize the disclosure in various embodiments and with various modifications as are suited to the particular use contemplated. It is intended that the scope of the disclosure be defined by the claims appended hereto Various examples have been described. These and other examples are within the scope of the following claims.

What is claimed is:

1. An apparatus configured to apply a treatment agent to an agricultural byproduct, the apparatus comprising:

a fragmenting system including a fragmenting chamber configured to fragment material into a particles and subsequently eject airborne particles at high speed;

a recovery zone configured to receive particles from the fragmenting chamber; and a regulator system configured to regulate the flow of a treatment agent such that a first quantity of the treatment agent is applied to the particles in the fragmenting chamber and a second quantity of the treatment agent is mixed with particles in the recovery zone while the particles are airborne and traveling at high speed; and a treatment agent dispensing system configured to increase or decrease a concentration of a solution including the treatment agent.

2. The apparatus of claim 1, wherein regulating the application includes dispensing the treatment agent in the fragmenting chamber and the recovery zone at a ratio of approximately one to four.

3. The apparatus of claim 1, wherein the material is an agricultural byproduct, particulated paper, wood chips or fibers.

4. The apparatus of claim 1, further comprising a control system and a moisture sensor, wherein the control system is configured to regulate the application of the treatment agent based a measured moisture level.

5. The apparatus of claim 1, further comprising a screening system configured to screen the particles such that particles of a desired size flow from the fragmenting chamber to the recovery zone.

6. The apparatus of claim 5, wherein the screened particles have an effective diameter of approximately 50 to 100 mm, and wherein regulating the application includes spraying the screened particles with the treatment agent as the screened particles enter the recovery zone.

7. The apparatus of claim 1, wherein the first quantity of the treatment agent and the second quantity of the treatment agent comprise different treatment agents.

8. The apparatus of claim 1, wherein the treatment agent comprises one or more of binding agents, color agents, and auxiliary coloring components.

9. The apparatus of claim 1, wherein the treatment agent is applied to the particles as one or more of a gas, liquid, aqueous solution, solid, colloid, dispersion, and emulsion.

\* \* \* \* \*